United States Patent
Kajino et al.

(10) Patent No.: US 11,205,973 B2
(45) Date of Patent: Dec. 21, 2021

(54) METHOD OF CONTROLLING PIEZOELECTRIC DRIVE DEVICE, METHOD OF CONTROLLING ROBOT, AND METHOD OF CONTROLLING PRINTER

(71) Applicant: Seiko Epson Corporation, Tokyo (JP)

(72) Inventors: Kiichi Kajino, Matsumoto (JP); Hidetoshi Saito, Fujimi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 195 days.

(21) Appl. No.: 16/752,768

(22) Filed: Jan. 27, 2020

(65) Prior Publication Data
US 2020/0244191 A1   Jul. 30, 2020

(30) Foreign Application Priority Data

Jan. 28, 2019   (JP) .............................. JP2019-011962

(51) Int. Cl.
| | | |
|---|---|---|
| *H02N 2/06* | (2006.01) | |
| *H02N 2/00* | (2006.01) | |
| *B41J 29/393* | (2006.01) | |
| *B41J 23/02* | (2006.01) | |
| *H02N 2/10* | (2006.01) | |
| *H02N 2/02* | (2006.01) | |
| *H02N 2/14* | (2006.01) | |
| *B41J 2/21* | (2006.01) | |

(52) U.S. Cl.
CPC ................ *H02N 2/06* (2013.01); *B41J 23/02* (2013.01); *B41J 29/393* (2013.01); *H02N 2/001* (2013.01); *H02N 2/004* (2013.01); *H02N 2/0075* (2013.01); *H02N 2/021* (2013.01); *H02N 2/062* (2013.01); *H02N 2/101* (2013.01); *H02N 2/103* (2013.01); *H02N 2/142* (2013.01); *B41J 2/21* (2013.01)

(58) Field of Classification Search
CPC ........ H02N 2/06; H02N 2/0075; H02N 2/103; H02N 2/004; H02N 2/001; H02N 2/021; H02N 2/062; H02N 2/101; H02N 2/142; B41J 2/21; B41J 23/02; B41J 29/393
See application file for complete search history.

(56) References Cited

U.S. PATENT DOCUMENTS

| | | | |
|---|---|---|---|
| 2003/0052628 A1 | 3/2003 | Kataoka | |
| 2019/0009528 A1* | 1/2019 | Yamada | ................. B41J 29/393 |

FOREIGN PATENT DOCUMENTS

| | | |
|---|---|---|
| JP | 2003-092891 A | 3/2003 |
| JP | 2010-183816 A | 8/2010 |

* cited by examiner

*Primary Examiner* — Emily P Pham
(74) *Attorney, Agent, or Firm* — Gang Yu

(57) ABSTRACT

A method of controlling a piezoelectric motor as a piezoelectric drive device having a vibrator including piezoelectric elements, a rotor as a driven unit that moves at a target speed by vibration of the vibrator, and drive signal generation units that generate drive signals and output the drive signals to the piezoelectric elements, includes intermittently outputting the drive signals to the piezoelectric elements by the drive signal generation units, wherein a time when output of the drive signals is stopped is shorter than a time from when output of the drive signal is stopped to stoppage of the vibration.

17 Claims, 17 Drawing Sheets

FIG. 8
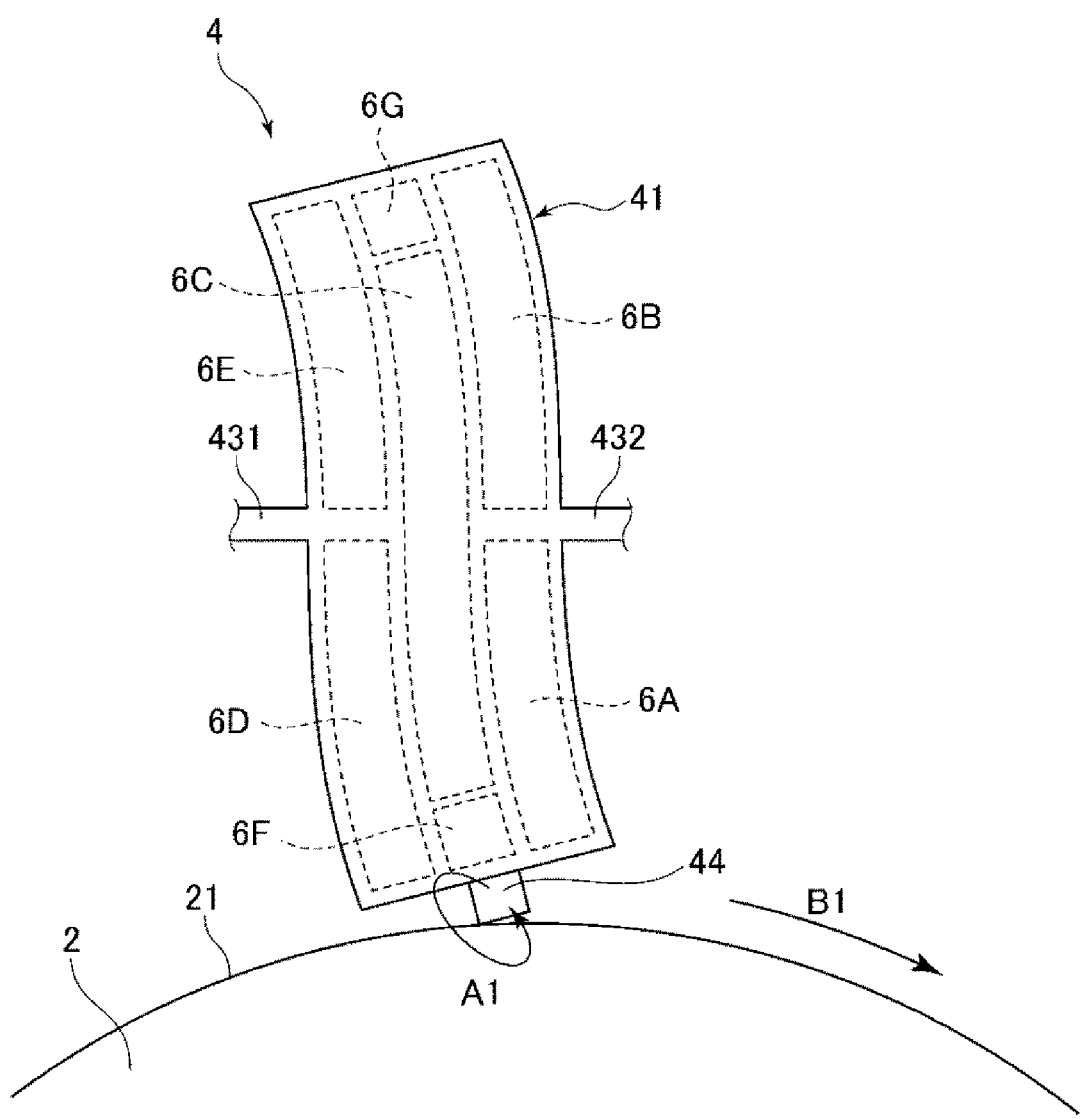
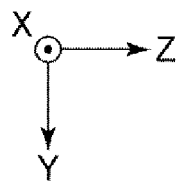

METHOD OF CONTROLLING PIEZOELECTRIC DRIVE DEVICE, METHOD OF CONTROLLING ROBOT, AND METHOD OF CONTROLLING PRINTER

The present application is based on, and claims priority from JP Application Serial Number 2019-011962, filed Jan. 28, 2019, the disclosure of which is hereby incorporated by reference herein in its entirety.

BACKGROUND

1. Technical Field

The present disclosure relates to a method of controlling a piezoelectric drive device, a method of controlling a robot, and a method of controlling a printer.

2. Related Art

An ultrasonic motor system having an ultrasonic vibrator, a driven member driven by the ultrasonic vibrator, a drive device applying a drive voltage to the ultrasonic vibrator is described in JP-A-2010-183816. The drive device of the ultrasonic motor system has a signal generation circuit that outputs a pulse signal and a drive circuit that generates a drive signal in a waveform close to sinusoidal wave from the pulse signal output from the signal generation circuit, and the drive signal output from the drive circuit is applied to the ultrasonic vibrator.

Further, the ultrasonic motor system adjusts the amplitude of the drive signal by changing Duty of the pulse signal output from the signal generation circuit within a range from 0% to 50% and controls a drive speed of the driven member. Specifically, the Duty of the pulse signal is changed toward the 0% side, and thereby, the driven member is decelerated. On the other hand, the Duty is changed toward the 50% side, and thereby, the driven member is accelerated.

However, in the case of the configuration like the ultrasonic motor system described in JP-A-2010-183816, the ultrasonic vibrator is driven by the drive signal generated from the pulse signal, and thus, there is a problem that driving of the ultrasonic vibrator is instable at the lower speed.

SUMMARY

A method of controlling a piezoelectric drive device according to an aspect of this application is a method of controlling a piezoelectric drive device having a vibrator including a piezoelectric element, a driven unit that moves at a target speed by vibration of the vibrator, and a drive signal generation unit that generates a drive signal and outputs the drive signal to the piezoelectric element, and of including outputting, by the driving signal generation, a first driving signal to the piezoelectric element for a first term, stopping the outputting of the first driving signal for a second term, outputting a second driving signal to the piezoelectric element for a third term, sequentially, to vibrate the piezoelectric element according to outputting the first and the second driving signals, wherein, the vibration amount of the piezoelectric element is decreased during the second term and the second driving signal is outputted before the vibration of the piezoelectric element is stopped.

In the above described method of controlling the piezoelectric drive device, further comprising stopping the outputting of the second signal for a fourth term after the third term, wherein the second term and the forth term is the same.

In the above described method of controlling the piezoelectric drive device, the second term is set to be shorter than the first term when the target speed is changed to be decreased after the first term.

In the above described method of controlling the piezoelectric drive device, the drive signal generation unit may control flexural vibration or stretching vibration of the vibrator.

In the above described method of controlling the piezoelectric drive device, the drive signal output by the drive signal generation unit may have a PWM waveform.

In the above described method of controlling the piezoelectric drive device, the drive signal output by the drive signal generation unit may be DA-converted, and then, amplified.

A method of controlling a robot according to an aspect of this application is a method of controlling a robot having a vibrator including a piezoelectric element, a driven unit that moves at a target speed by vibration of the vibrator, and a drive signal generation unit that generates a drive signal and outputs the drive signal to the piezoelectric element, and of including outputting, by the driving signal generation, a first driving signal to the piezoelectric element for a first term, stopping the outputting of the first driving signal for a second term, outputting a second driving signal to the piezoelectric element for a third term, sequentially, to vibrate the piezoelectric element according to outputting the first and the second driving signals, wherein, the vibration amount of the piezoelectric element is decreased during the second term and the second driving signal is outputted before the vibration of the piezoelectric element is stopped.

A method of controlling a printer according to an aspect of this application is a method of controlling a printer having a vibrator including a piezoelectric element, a driven unit that moves at a target speed by vibration of the vibrator, and a drive signal generation unit that generates a drive signal and outputs the drive signal to the piezoelectric element, and of including outputting, by the driving signal generation, a first driving signal to the piezoelectric element for a first term, stopping the outputting of the first driving signal for a second term, outputting a second driving signal to the piezoelectric element for a third term, sequentially, to vibrate the piezoelectric element according to outputting the first and the second driving signals, wherein, the vibration amount of the piezoelectric element is decreased during the second term and the second driving signal is outputted before the vibration of the piezoelectric element is stopped.

BRIEF DESCRIPTION OF THE DRAWINGS

FIG. 8 is a plan view showing a drive state of a piezoelectric motor.

DESCRIPTION OF EXEMPLARY EMBODIMENTS

As below, a method of controlling a piezoelectric drive device, a method of controlling a robot, and a method of controlling a printer according to the embodiments will be explained with reference to the accompanying drawings.

First Embodiment

A piezoelectric motor is taken as an example of a piezoelectric drive device according to the first embodiment and a method of controlling the piezoelectric drive device is explained with reference to FIGS. 1 to 13.

Figure 1:
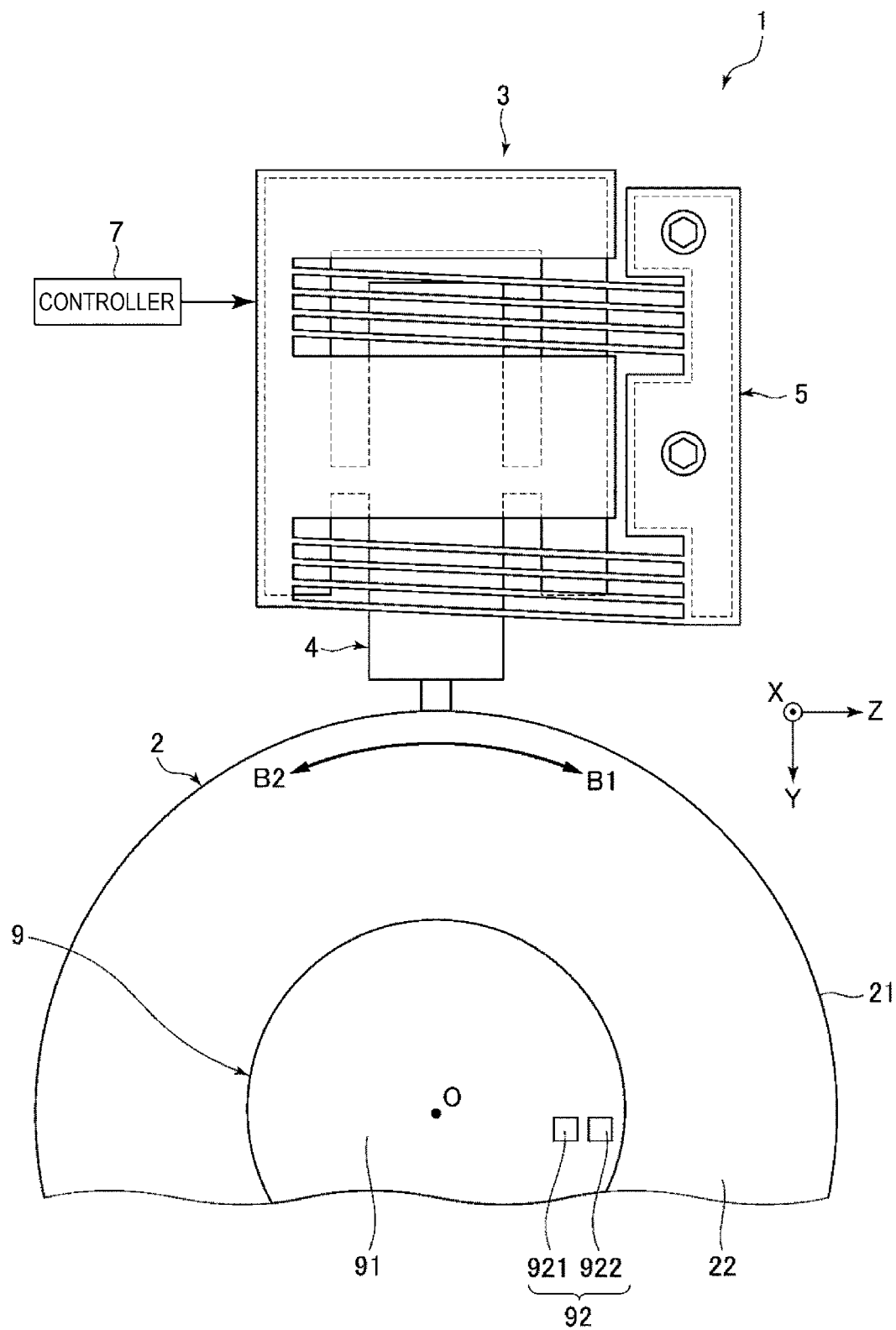
FIG. 1 is a schematic plan view showing a piezoelectric drive device according to a first embodiment.
Figure 2:
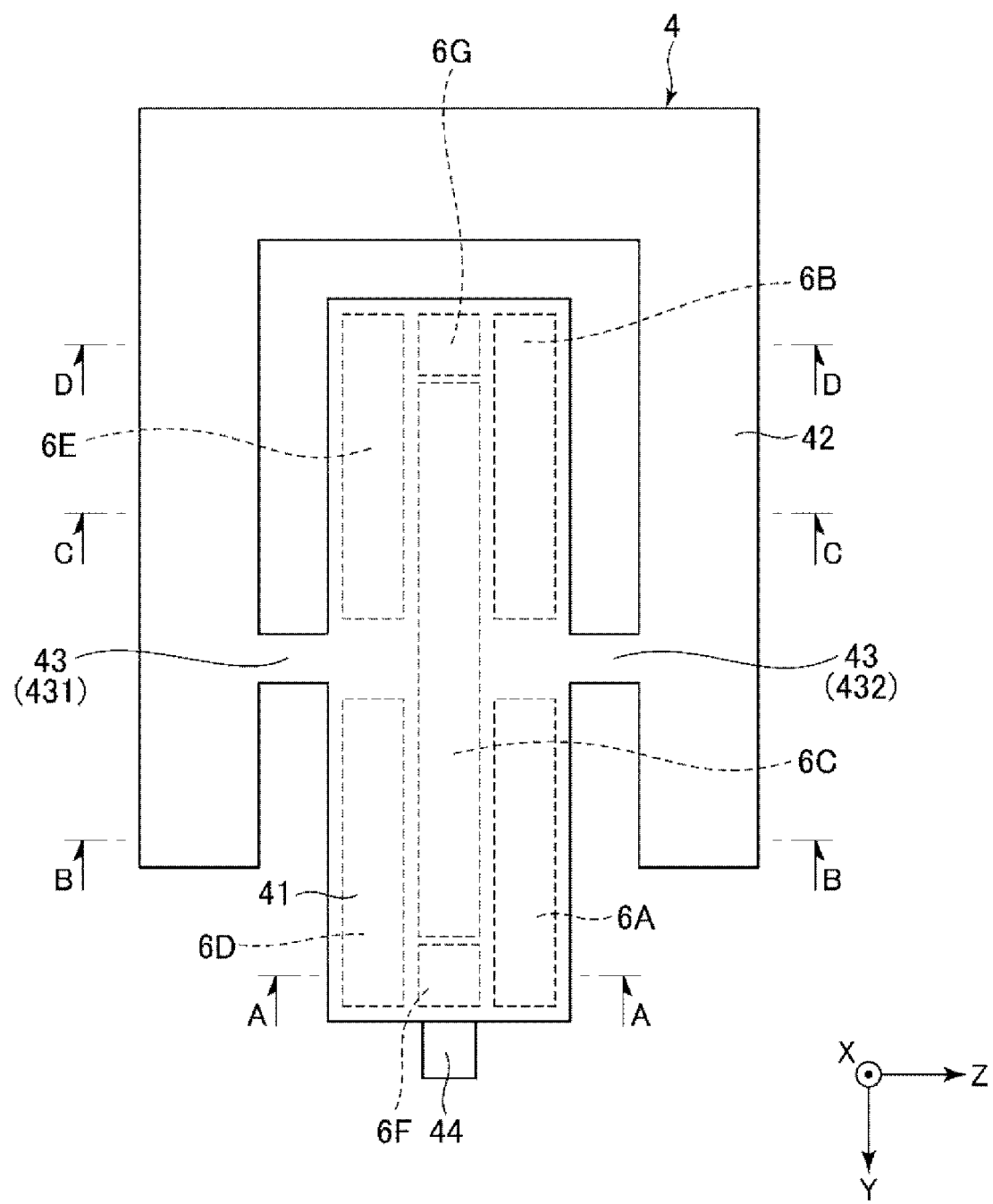
FIG. 2 is a schematic plan view showing a piezoelectric actuator.
Figure 3:
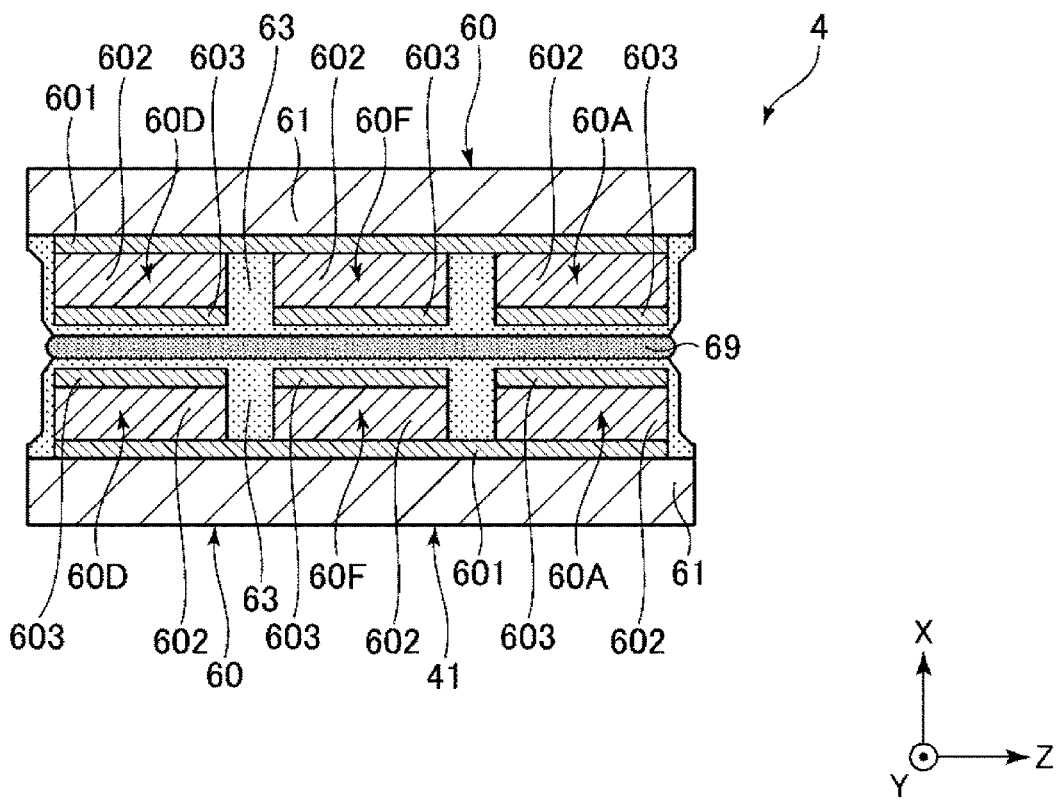
FIG. 3 is a sectional view along line A-A in FIG. 2.
Figure 4:
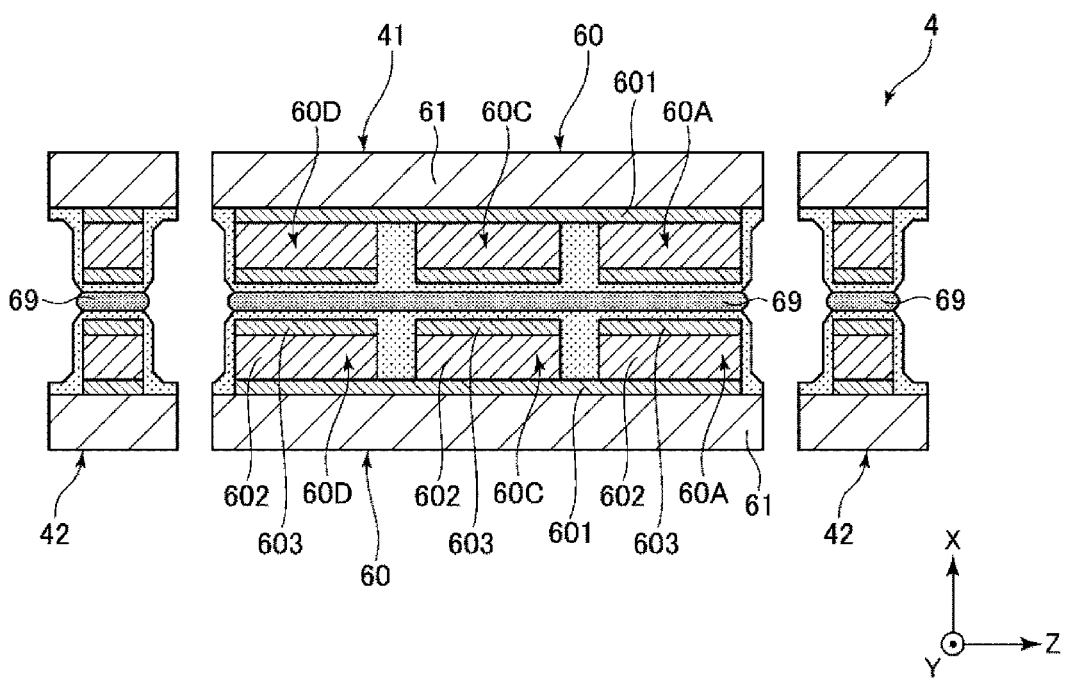
FIG. 4 is a sectional view along line B-B in FIG. 2.
Figure 5:
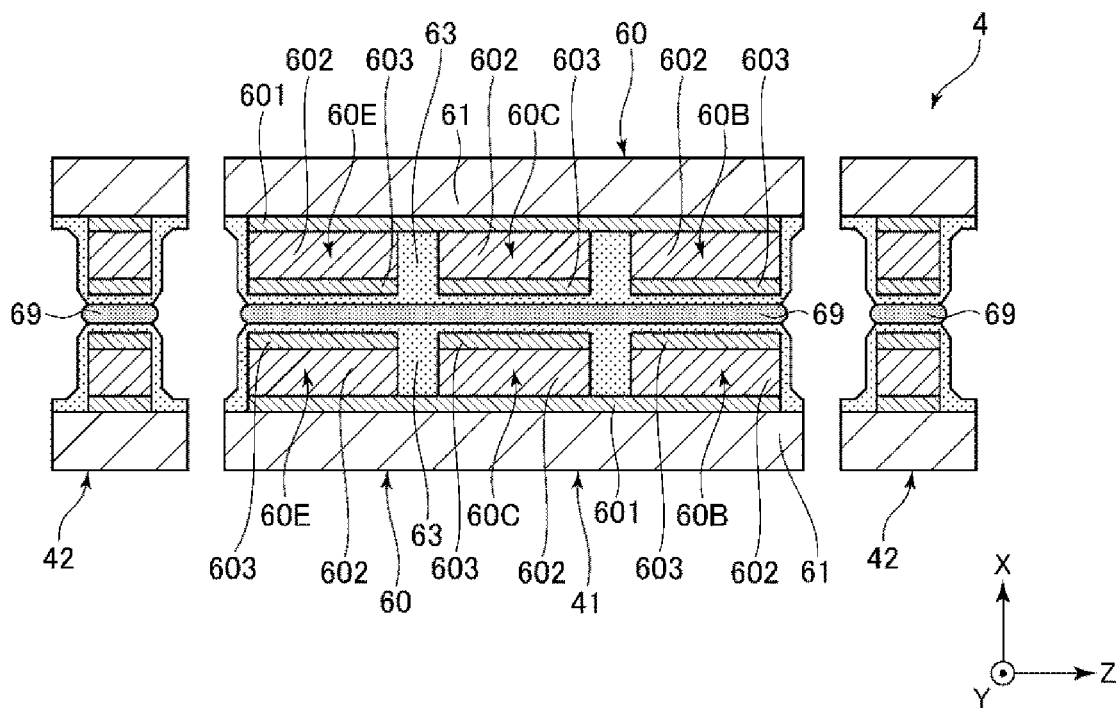
FIG. 5 is a sectional view along line C-C in FIG. 2.
Figure 6:
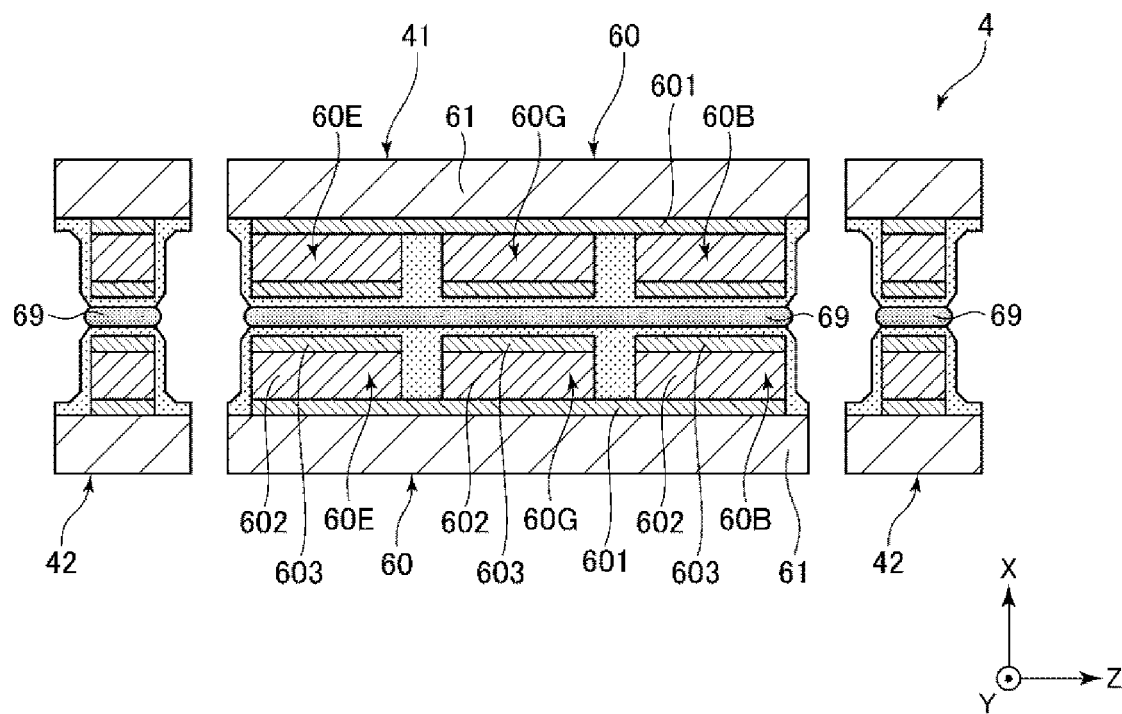
FIG. 6 is a sectional view along line D-D in FIG. 2.
Figure 7:
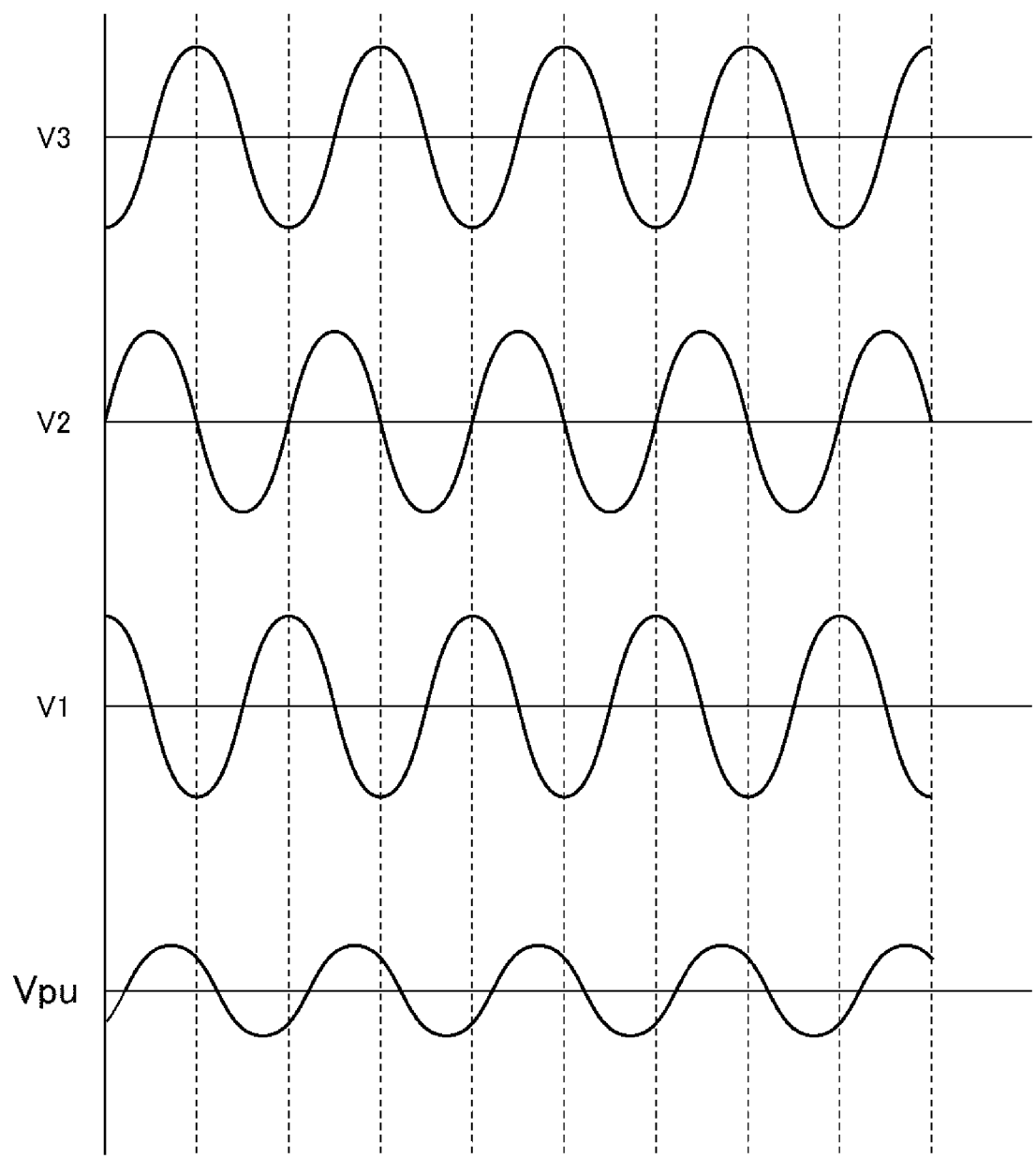
FIG. 7 shows drive signals.

FIG. 1 is the schematic plan view showing the piezoelectric motor as the piezoelectric drive device according to the first embodiment. FIG. 2 is the schematic plan view showing the piezoelectric actuator. FIG. 3 is the sectional view along line A-A in FIG. 2. FIG. 4 is the sectional view along line B-B in FIG. 2. FIG. 5 is the sectional view along line C-C in FIG. 2. FIG. 6 is the sectional view along line D-D in FIG. 2. FIG. 7 shows the drive signals.

Figure 9:
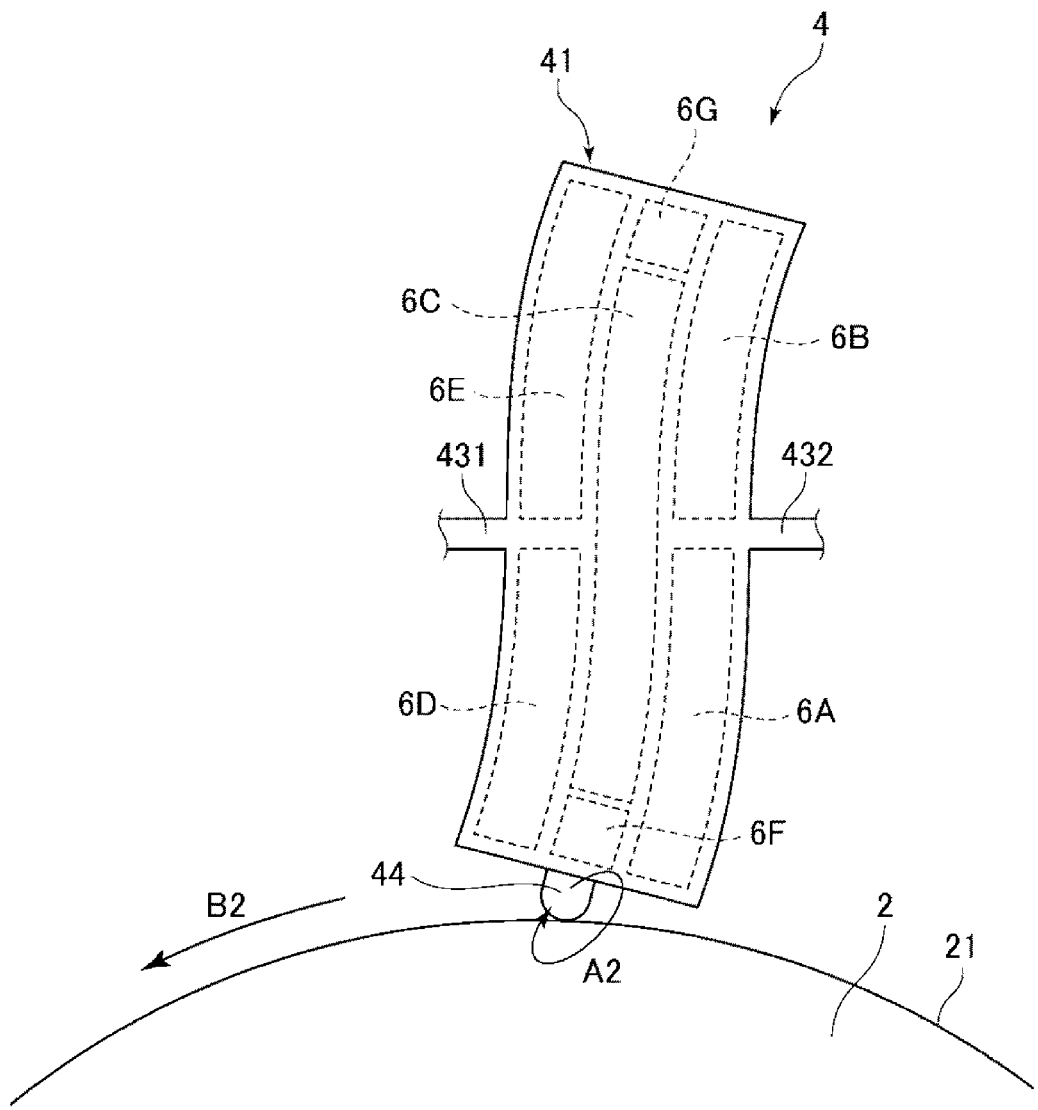
FIG. 9 is a plan view showing a drive state of the piezoelectric motor.
Figure 10:
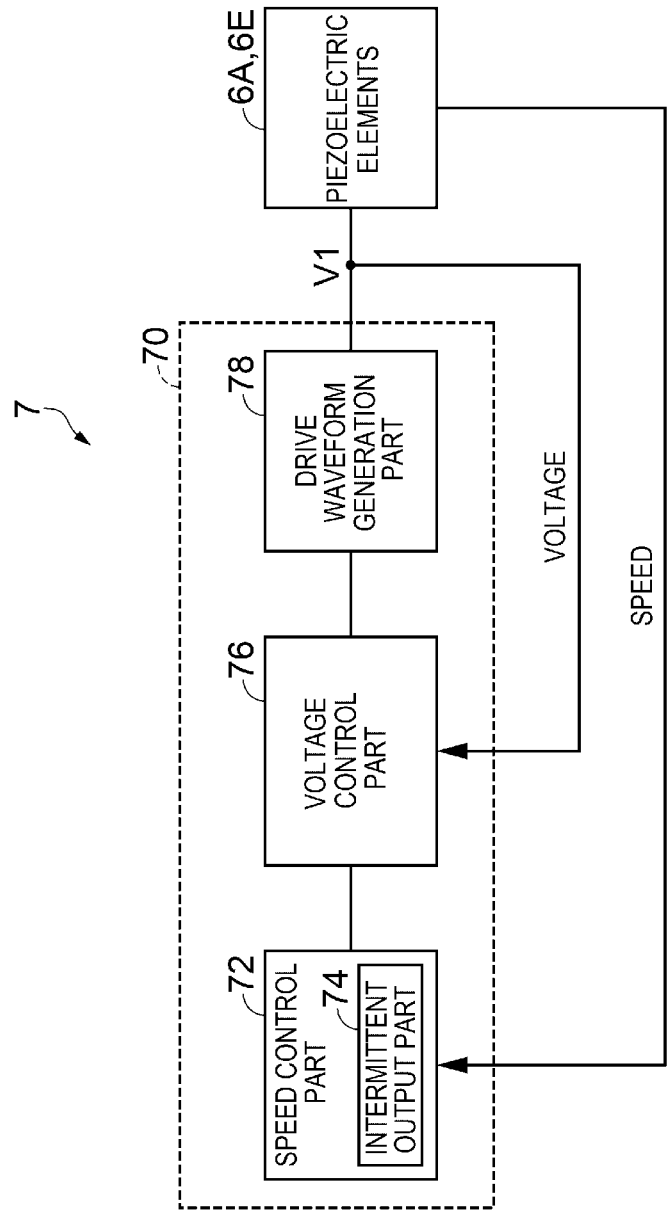
FIG. 10 is a block diagram showing a configuration of a drive signal generation unit.
Figure 11:
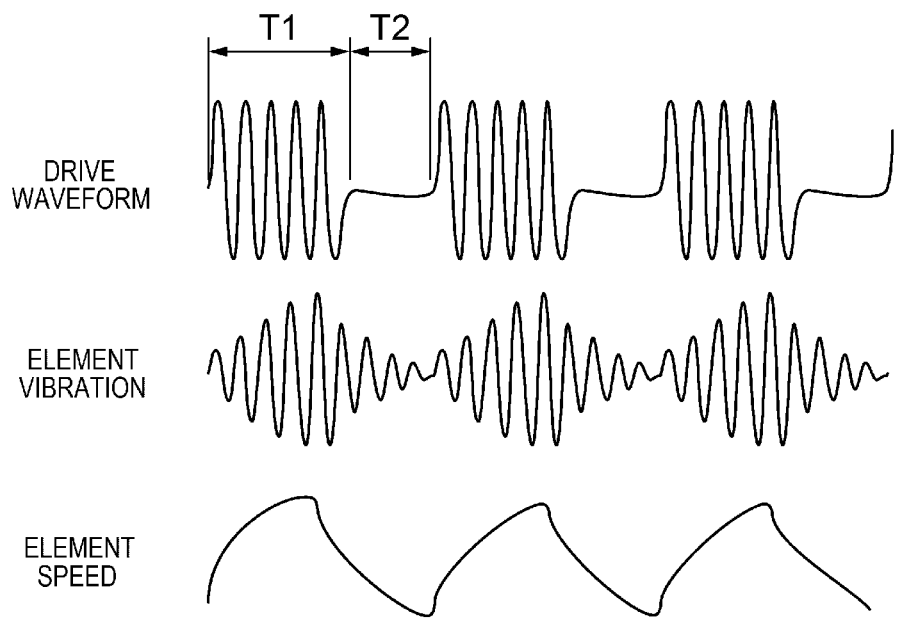
FIG. 11 is a diagram for explanation of the drive waveform of the drive signal.
Figure 12:
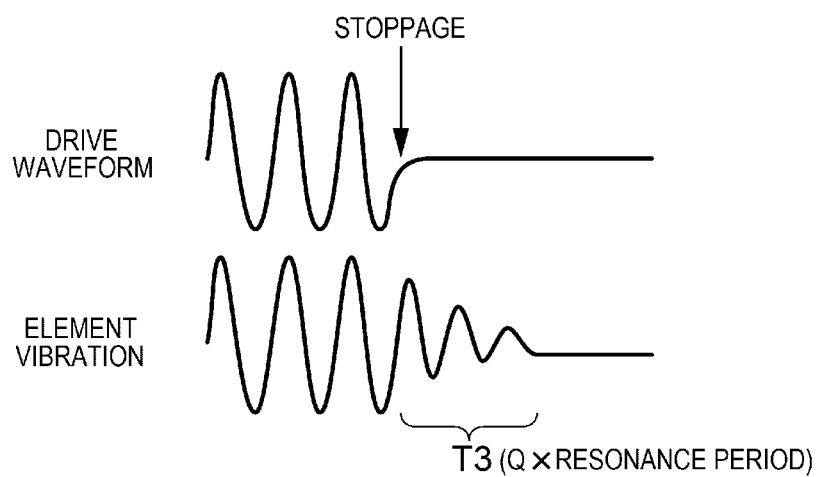
FIG. 12 is a diagram for explanation of the drive waveform of the drive signal.
Figure 13:
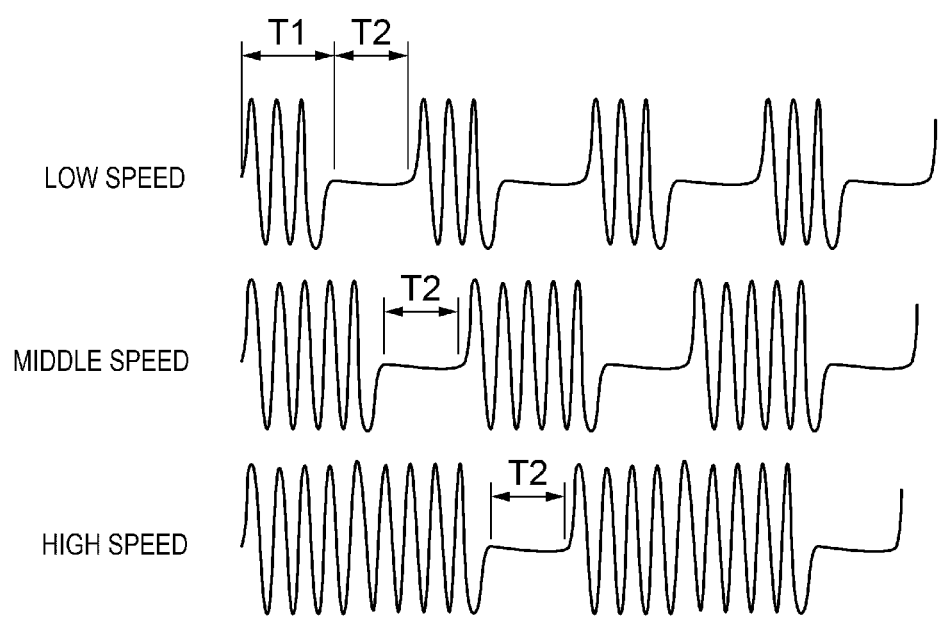
FIG. 13 is a diagram for explanation of the drive waveform of the drive signal.

FIGS. 8 and 9 are respectively plan views showing drive states of the piezoelectric motor. FIG. 10 is the block diagram showing the configuration of the drive signal generation unit. FIGS. 11 to 13 are the diagrams for explanation of the drive waveforms of the drive signals.

Note that, hereinafter, for convenience of explanation, three axes orthogonal to one another are referred to as "X-axis", "Y-axis", and "Z-axis", and a direction along the X-axis is also referred to as "X direction", a direction along the Y-axis is also referred to as "Y direction", and a direction along the Z-axis is also referred to as "Z direction".

Further, the head sides of arrows of the respective axes are also referred to as "plus sides" and the opposite sides to the head sides are also referred to as "minus sides".

Furthermore, the plus side in the X direction is also referred to as "upper" or "upside" and the minus side in the X direction is also referred to as "lower" or "downside".

As shown in FIG. 1, a piezoelectric motor 1 as the piezoelectric drive device according to the embodiment has a rotor 2 as a driven unit having a circular disk shape and being rotatable about a center axis O thereof and a drive unit 3 being in contact with an outer circumferential surface 21 of the rotor 2 and rotating the rotor 2 about the center axis O. The drive unit 3 has a piezoelectric actuator 4, an urging member 5 that urges the piezoelectric actuator 4 toward the rotor 2, and a controller 7 that controls driving of the piezoelectric actuator 4. In the piezoelectric motor 1, when the piezoelectric actuator 4 flexurally vibrates, the vibration is transmitted to the rotor 2, and the rotor 2 rotates about the center axis O clockwise as shown by an arrow B1 or counterclockwise as shown by an arrow B2.

Note that the configuration of the piezoelectric motor 1 is not limited to the configuration in FIG. 1. For example, a plurality of the drive devices 3 maybe placed along the circumferential direction of the rotor 2 and the rotor 2 may be rotated by driving of the plurality of piezoelectric drive devices 3. Further, the piezoelectric drive device 3 may be in contact with a principal surface 22 of the rotor 2, not with the outer circumferential surface 21 of the rotor 2. The driven unit is not limited to a rotor such as the rotor 2, but may be e.g. a slider that linearly moves.

In the embodiment, an encoder 9 is provided in the rotor 2 and the encoder 9 may detect the behavior of the rotor 2, particularly, an amount of rotation and an angular velocity. The encoder 9 is not particularly limited, but may be e.g. an incremental encoder that detects the amount of rotation when the rotor 2 rotates or an absolute encoder that detects an absolute position of the rotor 2 from the origin regardless of whether the rotor 2 rotates or not.

The encoder 9 of the embodiment has a scale 91 fixed to the upper surface of the rotor 2 and an optical element 92 provided at the upside of the scale 91. The scale 91 has a circular plate shape and has a pattern (not shown) provided on the upper surface thereof. On the other hand, the optical element 92 has a light emitting device 921 that radiates light toward the pattern of the scale 91 and an imaging device 922 that images the pattern of the scale 91. In the encoder 9 having the above described configuration, the amount of rotation, drive speed, absolute position, etc. of the rotor 2 may be detected by template matching of the image of the pattern acquired by the imaging device 922. Note that the configuration of the encoder 9 is not limited to the above described configuration. For example, a configuration including a light receiving device that receives reflected light or transmitted light from the scale 91 may be employed in place of the imaging device 922.

As shown in FIG. 2, the piezoelectric actuator 4 has a vibrator 41, a supporting portion 42 that supports the vibrator 41, a coupling portion 43 coupling the vibrator 41 and the supporting portion 42, and a convex portion 44 coupled to the vibrator 41 and transmitting the vibration of the vibrator 41 to the rotor 2.

The vibrator 41 has a plate shape having a thickness along the X direction and spreading on a Y-Z plane containing the Y-axis and the Z-axis, and flexurally vibrates in S-shapes by flexing in the Z direction while stretching in the Y direction. Further, the vibrator 41 has a rectangular shape elongated in the Y direction as the stretching direction in plan view from the X direction. Note that the shape of the vibrator 41 is not particularly limited as long as the vibrator may fulfill the function thereof.

As shown in FIG. 2, the vibrator 41 has driving piezoelectric elements 6A to 6E for flexural vibration of the vibrator 41 and detection piezoelectric elements 6F, 6G for detecting the vibration of the vibrator 41.

The piezoelectric element 6C is placed along the Y direction as the longitudinal direction of the vibrator 41 in the center part of the vibrator 41. The piezoelectric elements 6A, 6B are placed adjacent to each other in the longitudinal direction of the vibrator 41 at the plus side of the vibrator 41 in the Z direction with respect to the piezoelectric element 6C, and the piezoelectric elements 6D, 6E are placed adjacent to each other in the longitudinal direction of the vibrator 41 at the minus side in the Z direction. These piezoelectric elements 6A to 6E respectively expand and contract in the Y directions as the longitudinal directions of the vibrator 41 by energization. The piezoelectric elements 6A, 6E are electrically coupled to each other and the piezoelectric elements 6B, 6D are electrically coupled to each other.

As will be described later, drive signals V1, V2, V3 (alternating-current voltages) in different phases at the same frequency are applied to the piezoelectric elements 6A, 6E, the piezoelectric element 6C, and the piezoelectric elements 6B, 6D, respectively, and the expansion and contraction times of the elements are shifted, and thereby, the vibrator 41 may be flexurally vibrated in S-shapes within the plane thereof.

The piezoelectric element 6F is located at the plus side in the Y direction of the piezoelectric element 6C, and the piezoelectric element 6G is located at the minus side in the Y direction of the piezoelectric element 6C. Further, the piezoelectric elements 6F, 6G are electrically coupled to each other. External forces according to the vibration of the vibrator 41 with driving of the piezoelectric elements 6A to 6E are applied to the piezoelectric elements 6F, 6G, and the piezoelectric elements 6F, 6G output signals according to the applied external forces. Accordingly, the vibration state of the vibrator 41 may be sensed based on the signals output from the piezoelectric elements 6F, 6G.

The coupling portion 43 couples a part as a node of the flexural vibration of the vibrator 41, specifically, the center part in the Y direction and the supporting portion 42. Further, the coupling portion 43 has a first coupling part 431 located at the minus side in the Z direction with respect to the vibrator 41 and a second coupling part 432 located at the plus side in the Z direction. Note that the configuration of the coupling portion 43 is not particularly limited.

The above described vibrator 41, supporting portion 42, and coupling portion 43 have a configuration formed by bonding of two piezoelectric element units 60 to face each other as shown in FIGS. 3 to 6. Each piezoelectric element unit 60 has a substrate 61, the driving piezoelectric elements 60A, 60B, 60C, 60D, 60E and the detection piezoelectric elements 60F, 60G placed on the substrate 61, and a protective layer 63 covering the respective piezoelectric elements 60A to 60G.

Each of the piezoelectric elements 60A to 60G has a first electrode 601 placed on the substrate 61, a piezoelectric material 602 placed on the first electrode 601, and a second electrode 603 placed on the piezoelectric material 602. The first electrode 601 is provided in common with the piezoelectric elements 60A to 60G. On the other hand, the piezoelectric materials 602 and the second electrodes 603 are respectively individually provided in the piezoelectric elements 60A to 60G.

The two piezoelectric element units 60 are joined via an adhesive 69 with the surfaces on which the piezoelectric elements 60A to 60G are placed facing each other. The first electrodes 601 of the respective piezoelectric element units 60 are electrically coupled via wires or the like (not shown). Further, the second electrodes 603 of the piezoelectric elements 60A of the respective piezoelectric element units 60 are electrically coupled via wires or the like (not shown), and these two piezoelectric elements 60A form the piezoelectric element 6A. The same applies to the other piezoelectric elements 60B to 60G, and the two piezoelectric elements 60B form the piezoelectric element 6B, the two piezoelectric elements 60C form the piezoelectric element 6C, the two piezoelectric elements 60D form the piezoelectric element 6D, the two piezoelectric elements 60E form the piezoelectric element 6E, the two piezoelectric elements 60F form the piezoelectric element 6F, and the two piezoelectric elements 60G form the piezoelectric element 6G.

The constituent material of the piezoelectric material 602 is not particularly limited, but piezoelectric ceramics including e.g. lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, lead scandium niobate, etc. maybe used. Or, as the piezoelectric material 602, polyvinylidene fluoride, crystal quartz, or the like maybe used in addition to the above described piezoelectric ceramics.

The method of forming the piezoelectric material 602 is not particularly limited, but the piezoelectric material maybe formed from a bulk material or formed using the sol-gel method or sputtering method. In the embodiment, the piezoelectric material 602 is formed using the sol-gel method. Thereby, for example, the thinner piezoelectric material 602 is obtained compared to the case where the piezoelectric material is formed from the bulk material, and the thickness of the drive device 3 may be reduced.

The convex portion 44 is provided in the end part of the vibrator 41 and projects from the vibrator 41 toward the plus side in the Y direction. The end part of the convex portion 44 is in contact with the outer circumferential surface 21 of the rotor 2. Accordingly, the vibration of the vibrator 41 is transmitted to the rotor 2 via the convex portion 44.

For example, when the drive signal V1 shown in FIG. 7 is applied to the piezoelectric elements 6A, 6E, the drive signal V2 is applied to the piezoelectric element 6C, and the drive signal V3 is applied to the piezoelectric elements 6B, 6D, if the piezoelectric elements 6A, 6E deform toward the outside of the vibrator 41, the piezoelectric elements 6B, 6D deform toward the inside of the vibrator 41 because the drive signal V1 and the drive signal V3 are out of phase by 180°. On the other hand, if the piezoelectric elements 6A, 6E deform toward the inside of the vibrator 41, the piezoelectric elements 6B, 6D deform toward the outside of the vibrator 41. Accordingly, the vibrator 41 is displaced in S-shapes in the Z directions. Further, the piezoelectric element 6C stretchingly vibrates in the Y directions. Accordingly, as shown in FIG. 8, the vibrator 41 flexurally vibrates in S-shapes in the Z directions while stretchingly vibrating in the Y directions, and these vibrations are synthesized and the end of the convex portion 44 makes elliptic motion (rotary motion) drawing an elliptical trajectory counterclockwise as shown by an arrow A1. The rotor 2 is sent out by the elliptic motion of the convex portion 44, and the rotor 2 rotates clockwise as shown by the arrow B1. In response to the vibration of the vibrator 41, pickup voltages Vpu are output from the piezoelectric elements 6F, 6G.

Note that, in the embodiment, the end of the convex portion 44 is allowed to make elliptic motion using the flexural vibration and the stretching vibration as in-plane vibrations of displacing the vibrator 41 inside of the Y-Z plane to drive the rotor 2, however, the vibrator 41 may be vibrated by out-of-plane vibration of displacing the vibrator 41 outside of the Y-Z plane and the end of the convex portion 44 may be allowed to make elliptic motion to drive the rotor 2.

When the drive signals V1, V3 are switched, that is, when the drive signal V1 is applied to the piezoelectric elements 6B, 6D, the drive signal V2 is applied to the piezoelectric element 6C, and the drive signal V3 is applied to the piezoelectric elements 6A, 6E, as shown in FIG. 9, the vibrator 41 flexurally vibrates in S-shapes in the Z directions while stretchingly vibrating in the Y directions, and these vibrations are synthesized and the convex portion 44 makes elliptic motion clockwise as shown by an arrow A2. The rotor 2 is sent out by the elliptic motion of the convex portion 44, and the rotor 2 rotates counterclockwise as shown by the arrow B2. In response to the vibration of the vibrator 41, the pickup voltages Vpu are output from the piezoelectric elements 6F, 6G.

As described above, the convex portion 44 flexurally vibrates in the Z directions by the expansion and contraction of the piezoelectric elements 6A, 6B, 6D, 6E and sends out the rotor 2 in the direction of the arrow B1 or the arrow B2. Accordingly, the amplitude of the drive signals V1, V3 applied to the piezoelectric elements 6A, 6B, 6D, 6E is controlled and the amplitude of the convex portion 44 in the Z directions is controlled, and thereby, the drive speed of the rotor 2 may be controlled. Specifically, when the amplitude of the drive signals V1, V3 is increased, the amplitude of the convex portion 44 in the Z directions increases and the drive speed of the rotor 2 increases, and, when the amplitude of the drive signals V1, V3 is decreased, the amplitude of the convex portion 44 in the Z directions decreases and the drive speed of the rotor 2 decreases.

Note that, in the embodiment, the patterns of the drive signals applied to the piezoelectric elements 6A to 6E are not particularly limited as long as the rotor 2 may be rotated at least in one direction.

The controller 7 applies the drive signals V1, V2, V3 as the alternating-current voltages to the piezoelectric elements 6A to 6E, and thereby, controls driving of the drive device 3.

Further, the controller 7 has drive signal generation units 70 that generate the drive signals V1, V2, V3 and output and apply the generated drive signals V1, V2, V3 to the corresponding piezoelectric elements 6A, 6B, 6C, 6D, 6E.

Note that the controller 7 has the three drive signal generation units 70 of the drive signal generation unit 70 outputting the drive signal V1 to the piezoelectric elements 6A, 6E that flexurally vibrate the vibrator 41 in the Z directions, the drive signal generation unit 70 outputting the drive signal V2 to the piezoelectric element 6C that stretchingly vibrates the vibrator 41 in the Y directions, and the drive signal generation unit 70 outputting the drive signal V3 to the piezoelectric elements 6B, 6D that flexurally vibrate the vibrator 41 in the Z directions.

The three drive signal generation units 70 have the same function, and the drive signal generation unit 70 generating and outputting the drive signal V1 to the piezoelectric elements 6A, 6E is explained as an example.

As shown in FIG. 10, the drive signal generation unit 70 has a speed control part 72, a voltage control part 76, and a drive waveform generation part 78.

The speed control part 72 feeds back element speed information of the piezoelectric elements 6A, 6E or drive speed information of the rotor 2, and outputs a drive voltage for controlling the speed to the voltage control part 76.

The voltage control part 76 feeds back voltage information of the drive signal V1, and controls and outputs the drive voltage to the drive waveform generation part 78.

The drive waveform generation part 78 generates and outputs a drive waveform at a frequencies based on the resonance frequency of the piezoelectric elements 6A, 6E from the input drive voltage as the drive voltage V1.

However, in the method, to reduce the drive speed of the rotor 2, it is necessary to reduce the drive voltage of the drive signal V1. If the drive voltage of the drive signal V1 is made too small, the vibration of the piezoelectric elements 6A, 6E becomes unstable or the vibration stops, and driving at a desired speed may be hard or the driving may stop.

Accordingly, in the embodiment, an intermittent output part 74 is provided in the speed control part 72 and the drive signals V1, V2, V3 having the drive voltages that stabilize the vibrations of the piezoelectric elements 6A to 6E are intermittently output, and thereby, low-speed driving can be realized.

FIG. 11 shows the drive waveform of the drive signal V1, the element vibration of the piezoelectric elements 6A, 6E, and the element speed of the piezoelectric elements 6A, 6E in time sequence. In time T1 when the drive signal V1 is output, in the element vibration of the piezoelectric elements 6A, 6E, the amplitude thereof gradually increases and, in time T2 when the output of the drive signal V1 is stopped, the amplitude of the element vibration is gradually damped. Further, regarding the element speed of the piezoelectric elements 6A, 6E, like the element vibration, in time T1 when the drive signal V1 is output, the element speed gradually increases and, in time T2 when the output of the drive signal V1 is stopped, the element speed is gradually damped.

Further, regarding the element vibration of the piezoelectric elements 6A, 6E, when the output of the drive signal V1 is stopped and no drive signal V1 is applied, as shown in FIG. 12, the amplitude of the vibration is gradually damped and stopped at a predetermined time. Note that time T3 to stoppage of the element vibration takes a value obtained by multiplication of the Q-value of the piezoelectric elements 6A, 6E by a resonance period as an inverse of the resonance frequency of the piezoelectric elements 6A, 6E. Accordingly, in the embodiment, the time T2 when the output of the drive signal V1 is stopped is set to be shorter than the time T3 to stoppage of the element vibration. That is, before the stoppage of the element vibration of the piezoelectric elements 6A, 6E, the drive signal V1 is output again and applied to the piezoelectric elements 6A, 6E.

Therefore, the element vibration of the piezoelectric elements 6A, 6E may continue without stopping and drive the rotor 2.

Here, as shown in FIG. 13, the time T2 when the output of the drive signal V1 is stopped is constant regardless of the target speed such as the low speed, middle speed, high speed, or the like of the element speed of the piezoelectric elements 6A, 6E or the drive speed of the rotor 2, and shorter than the time T3 to stoppage of the element vibration. The time T2 when the output of the drive signal V1 is stopped is set to be constant regardless of the target speed, and thereby, intermittent control of the drive voltage in the intermittent output part 74 of the speed control part 72 is easier.

As shown in FIG. 13, when the target speed is decreased, the time T1 when the drive signal V1 is output is set to be shorter to address the lower speed. The time T1 when the drive signal V1 is output is set to be shorter, thereby, the time when the piezoelectric elements 6A, 6E are vibrated is shorter and the element speed of the piezoelectric elements 6A, 6E is lower, and thus, the rotor 2 may be driven at the lower speed.

Therefore, the three drive signal generation units 70 that generate the drive signals V1, V2, V3 and intermittently output and apply the generated drive signals V1, V2, V3 to the corresponding piezoelectric elements 6A, 6B, 6C, 6D, 6E may control the vibrator 41 to flexurally vibrate in the S-shapes in the Z directions while stretchingly vibrate in the Y directions, allow the end of the convex portion 44 to make elliptic motion, and drive the rotor 2.

As described above, the method of controlling the piezoelectric motor 1 as the piezoelectric drive device according to the embodiment may realize stable vibration and low-speed control of the vibrator 41 including the piezoelectric elements 6A to 6E by the drive signal generation units 70 intermittently outputting the drive signals V1 to V3 to the piezoelectric elements 6A to 6E. Further, the time T2 when the output of the drive signals V1 to V3 is stopped is set to be shorter than the time T3 from when output of the drive signal is stopped to stoppage of the vibration of the vibrator 41, and thereby, the vibrator 41 may be vibrated before the stoppage of the vibration of the vibrator 41, the vibrator 41 may be stably vibrated, and the low-speed control may be maintained.

Further, the time T2 when the output of the drive signals V1 to V3 is stopped is set to be constant regardless of the target speed of the drive speed of the rotor 2, and thereby, the low-speed control is easier.

When the target speed of the drive speed of the rotor 2 is decreased, the time T1 when the drive signals V1 to V3 are output is set to be shorter, thereby, the time when the vibrator 41 is vibrated is shorter and the element speed is lower, and thus, the rotor 2 may be driven at the lower speed.

The drive signal generation units 70 intermittently output the drive signals V1 to V3 to the piezoelectric elements 6A to 6E and control the flexurally vibration or stretching vibration of the vibrator 41, and thus, may allow the vibrator 41 to make elliptic motion and drive the rotor 2.

Second Embodiment

Next, the drive signal generation unit of the piezoelectric drive device according to the second embodiment will be explained with reference to FIG. 14.

Figure 14:
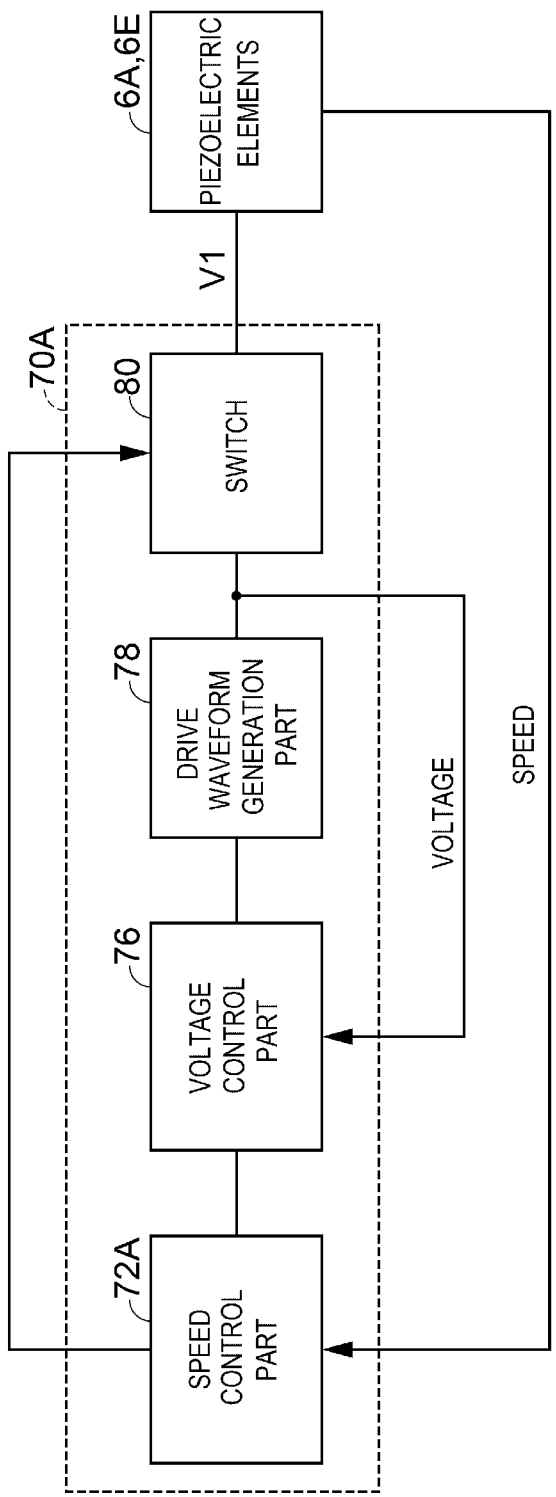
FIG. 14 is a block diagram showing a configuration of a drive signal generation unit according to a second embodiment.

FIG. 14 is the block diagram showing the configuration of the drive signal generation unit according to the second embodiment.

Note that the explanation will be made with a focus on the differences from the above described first embodiment and the explanation of the same items will be omitted. The embodiment is the same as the first embodiment except that the intermittent output part 74 is not provided, but a switch 80 is provided in a speed control part 72A.

In a drive signal generation unit 70A according to the embodiment, the switch 80 is provided between the drive waveform generation part 78 and the piezoelectric elements 6A, 6E. The speed control part 72A sets the time T1 when the drive signal V1 output from the drive waveform generation part 78 is output and the time T2 when the signal is stopped for control of the speed with the feedback of the element speed information of the piezoelectric elements 6A, 6E and controls the switch 80 to be on and off, and thereby, may intermittently output the drive signal V1 and control the element speed, i.e., the drive speed of the rotor 2.

According to the configuration, the drive signal generation units 70A may intermittently output the drive signals V1 to V3 to the piezoelectric elements 6A to 6E, and stably vibrate and low-speed control the vibrator 41 including the piezoelectric elements 6A to 6E. Further, the time T2 when the output of the drive signals V1 to V3 is stopped is set to be shorter than the time T3 from when output of the drive signal is stopped to stoppage of the vibration of the vibrator 41, and thereby, the vibrator 41 may be vibrated before the stoppage of the vibration of the vibrator 41, the vibrator 41 may be stably vibrated, and the low-speed control may be maintained. Accordingly, stable low-speed driving can be realized.

Third Embodiment

Next, the drive signal generation unit of the piezoelectric drive device according to the third embodiment will be explained with reference to FIG. 15.

Figure 15:
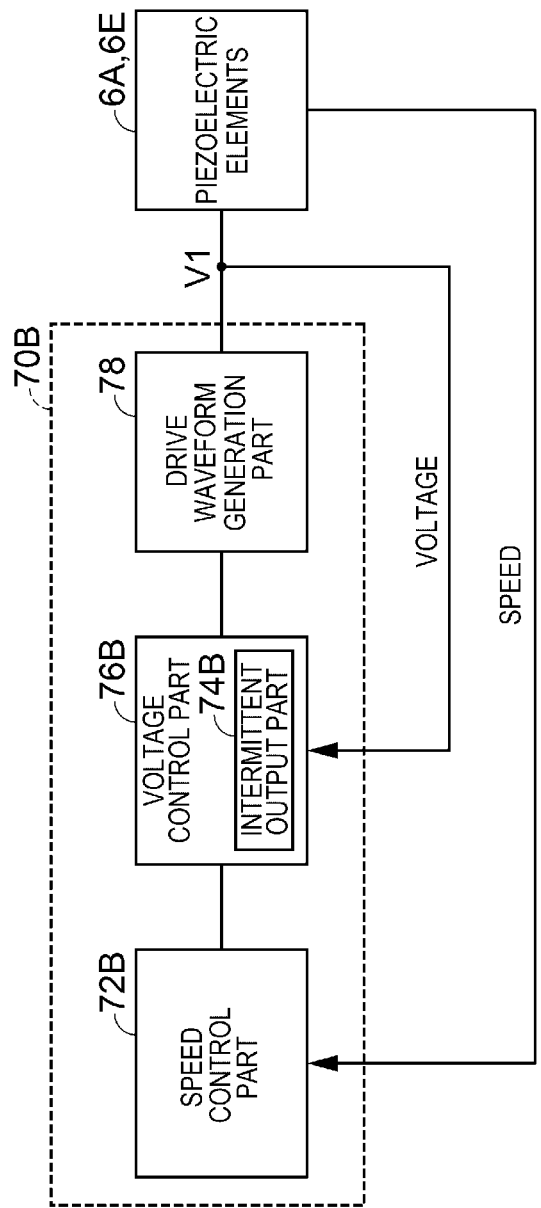
FIG. 15 is a block diagram showing a configuration of a drive signal generation unit according to a third embodiment.

FIG. 15 is the block diagram showing the configuration of the drive signal generation unit according to the third embodiment.

Note that the explanation will be made with a focus on the differences from the above described first embodiment and the explanation of the same items will be omitted. The embodiment is the same as the first embodiment except that the intermittent output part 74 is not provided in a speed control part 72B, but an intermittent output part 74B is provided in a voltage control part 76B.

In a drive signal generation unit 70B according to the embodiment, the intermittent output part 74B is provided in the voltage control part 76B. The voltage control part 76B feeds back voltage information of the drive signal V1, sets the time T1 when the drive signal V1 output from the drive waveform generation part 78 is output and the time T2 when the signal is stopped, and intermittently outputs a voltage-controlled drive voltage to the drive waveform generation part 78. Accordingly, the drive signal V1 may be intermittently output from the drive waveform generation part 78.

According to the configuration, the drive signal generation unit 70B may intermittently output the drive signals V1 to V3 to the piezoelectric elements 6A to 6E, and stably vibrate and low-speed control the vibrator 41 including the piezoelectric elements 6A to 6E. Further, the time T2 when the output of the drive signals V1 to V3 is stopped is set to be shorter than the time T3 from when output of the drive signal is stopped to stoppage of the vibration of the vibrator 41, and thereby, the vibrator 41 maybe vibrated before the stoppage of the vibration of the vibrator 41, the vibrator 41 may be stably vibrated, and the low-speed control may be maintained. Accordingly, stable low-speed driving can be realized.

Fourth Embodiment

Next, the drive signal generation unit of the piezoelectric drive device according to the fourth embodiment will be explained with reference to FIG. 16.

Figure 16:
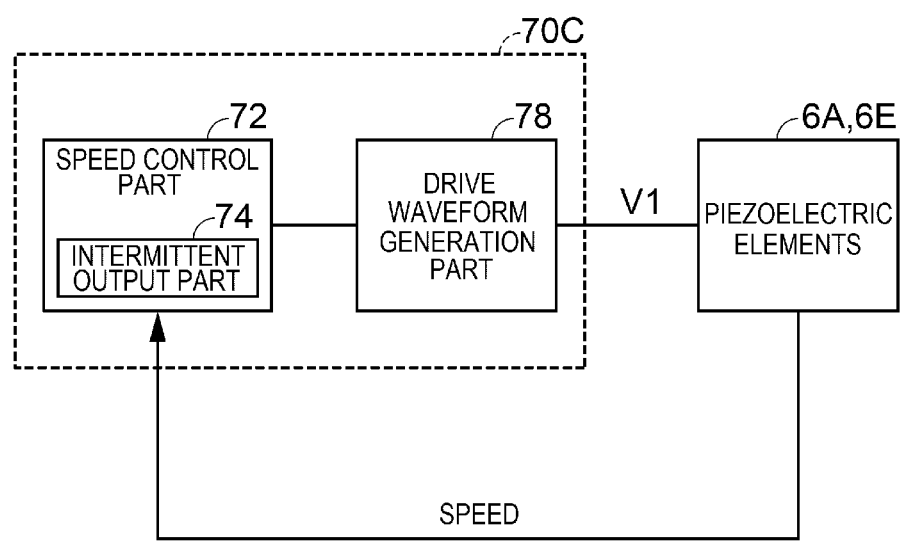
FIG. 16 is a block diagram showing a configuration of a drive signal generation unit according to a fourth embodiment.

FIG. 16 is the block diagram showing the configuration of the drive signal generation unit according to the fourth embodiment.

Note that the explanation will be made with a focus on the differences from the above described first embodiment and the explanation of the same items will be omitted. The embodiment is the same as the first embodiment except that the voltage control part 76 is not provided.

A drive signal generation unit 70C according to the embodiment includes the speed control part 72 having the intermittent output part 74 and the drive waveform generation part 78. The speed control part 72 sets the time T1 when the drive signal V1 output from the drive waveform generation part 78 is output and the time T2 when the signal is stopped in the intermittent output part 74 for control of the speed with the feedback of the element speed information of the piezoelectric elements 6A, 6E and intermittently outputs the drive voltage to the drive waveform generation part 78, and thereby, may intermittently output the drive signal V1 from the drive waveform generation part 78.

According to the configuration, the drive signal generation units 70C may intermittently output the drive signals V1 to V3 to the piezoelectric elements 6A to 6E, and stably vibrate and low-speed control the vibrator 41 including the piezoelectric elements 6A to 6E. Further, the time T2 when the output of the drive signals V1 to V3 is stopped is set to be shorter than the time T3 from when output of the drive signal is stopped to stoppage of the vibration of the vibrator 41, and thereby, the vibrator 41 maybe vibrated before the stoppage of the vibration of the vibrator 41, the vibrator 41 may be stably vibrated, and the low-speed control may be maintained. Accordingly, stable low-speed driving can be realized.

Fifth Embodiment

Next, the drive signal generation unit of the piezoelectric drive device according to the fifth embodiment will be explained with reference to FIG. 17.

Figure 17:
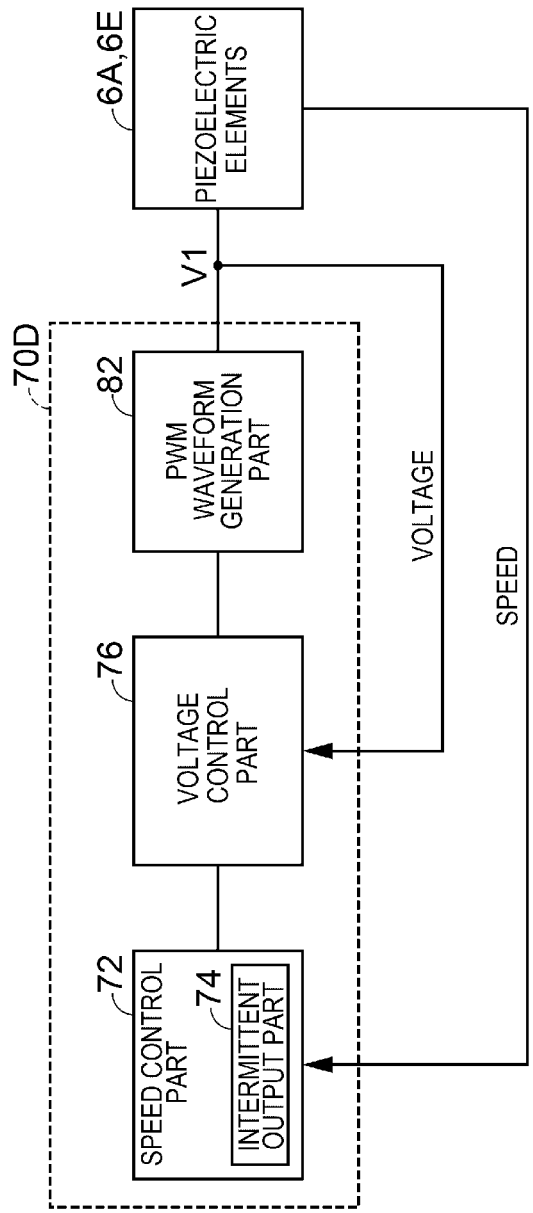
FIG. 17 is a block diagram showing a configuration of a drive signal generation unit according to a fifth embodiment.

FIG. 17 is the block diagram showing the configuration of the drive signal generation unit according to the fifth embodiment.

Note that the explanation will be made with a focus on the differences from the above described first embodiment and the explanation of the same items will be omitted. The embodiment is the same as the first embodiment except that a PWM (Pulse Width Modulation) waveform generation part 82 is provided in place of the drive waveform generation part 78.

A drive signal generation unit 70D according to the embodiment includes the speed control part 72 having the intermittent output part 74, the voltage control part 76, and the PWM waveform generation part 82 that modulates the pulse width of the drive voltage. The speed control part 72 sets the time T1 when the drive signal V1 output from the PWM waveform generation part 82 is output and the time T2 when the signal is stopped in the intermittent output part 74 for control of the speed with the feedback of the element speed information of the piezoelectric elements 6A, 6E and intermittently outputs the drive voltage to the voltage control part 76, and thereby, may intermittently output the drive signal V1 having the modulated pulse width from the PWM waveform generation part 82.

According to the configuration, the drive signal generation units 70D may intermittently output the drive signals V1 to V3 to the piezoelectric elements 6A to 6E, and stably vibrate and low-speed control the vibrator 41 including the piezoelectric elements 6A to 6E. Further, the time T2 when the output of the drive signals V1 to V3 is stopped is set to be shorter than the time T3 from when output of the drive signal is stopped to stoppage of the vibration of the vibrator 41, and thereby, the vibrator 41 maybe vibrated before the stoppage of the vibration of the vibrator 41, the vibrator 41 may be stably vibrated, and the low-speed control may be maintained. Accordingly, stable low-speed driving can be realized.

Sixth Embodiment

Next, the drive signal generation unit of the piezoelectric drive device according to the sixth embodiment will be explained with reference to FIG. 18.

Figure 18:
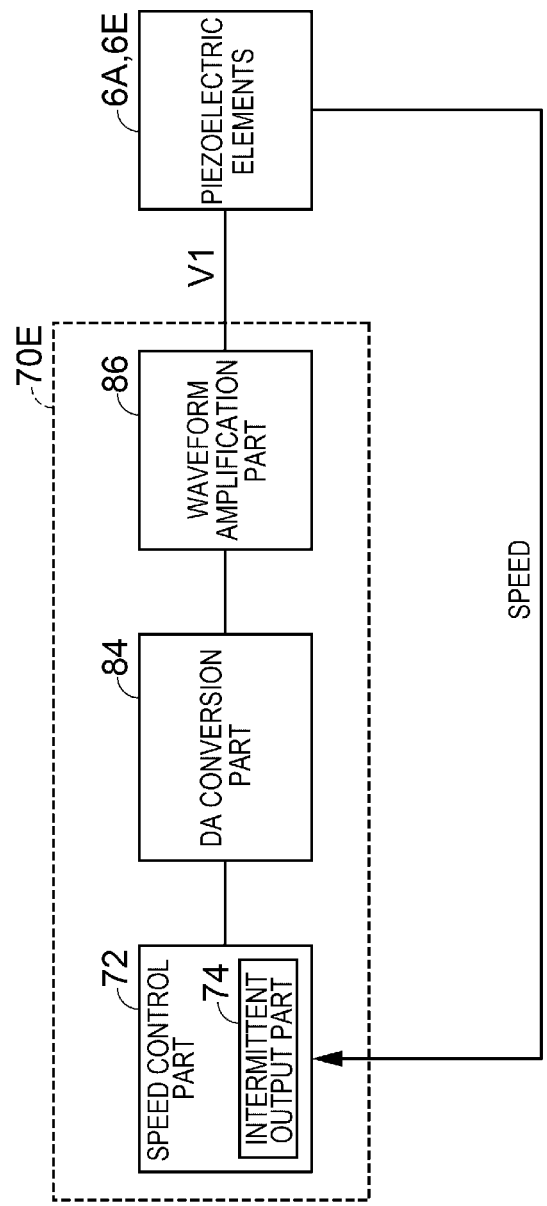
FIG. 18 is a block diagram showing a configuration of a drive signal generation unit according to a sixth embodiment.

FIG. 18 is the block diagram showing the configuration of the drive signal generation unit according to the sixth embodiment.

Note that the explanation will be made with a focus on the differences from the above described first embodiment and the explanation of the same items will be omitted. The embodiment is the same as the first embodiment except that a DA conversion part 84 and a waveform amplification part 86 are provided in place of the voltage control part 76 and the drive waveform generation part 78.

A drive signal generation unit 70E according to the embodiment includes the speed control part 72 having the intermittent output part 74, the DA conversion part 84 that DA-converts the drive voltage intermittently output from the speed control part 72, and the waveform amplification part 86 that amplifies the drive waveform DA-converted in the DA conversion part 84. The speed control part 72 sets the time T1 when the drive signal V1 output from the waveform amplification part 86 is output and the time T2 when the signal is stopped in the intermittent output part 74 for control of the speed with the feedback of the element speed information of the piezoelectric elements 6A, 6E and intermittently outputs the drive voltage to the DA conversion part 84, and thereby, may intermittently output the drive signal V1 having the amplified drive waveform from the waveform amplification part 86.

According to the configuration, the drive signal generation units 70E may intermittently output the drive signals V1 to V3 to the piezoelectric elements 6A to 6E, and stably vibrate and low-speed control the vibrator 41 including the piezoelectric elements 6A to 6E. Further, the time T2 when the output of the drive signals V1 to V3 is stopped is set to be shorter than the time T3 from when output of the drive signal is stopped to stoppage of the vibration of the vibrator 41, and thereby, the vibrator 41 may be vibrated before the stoppage of the vibration of the vibrator 41, the vibrator 41 may be stably vibrated, and the low-speed control may be maintained. Accordingly, stable low-speed driving can be realized.

Seventh Embodiment

Next, a method of controlling a robot according to the seventh embodiment will be explained with reference to FIG. 19.

Figure 19:
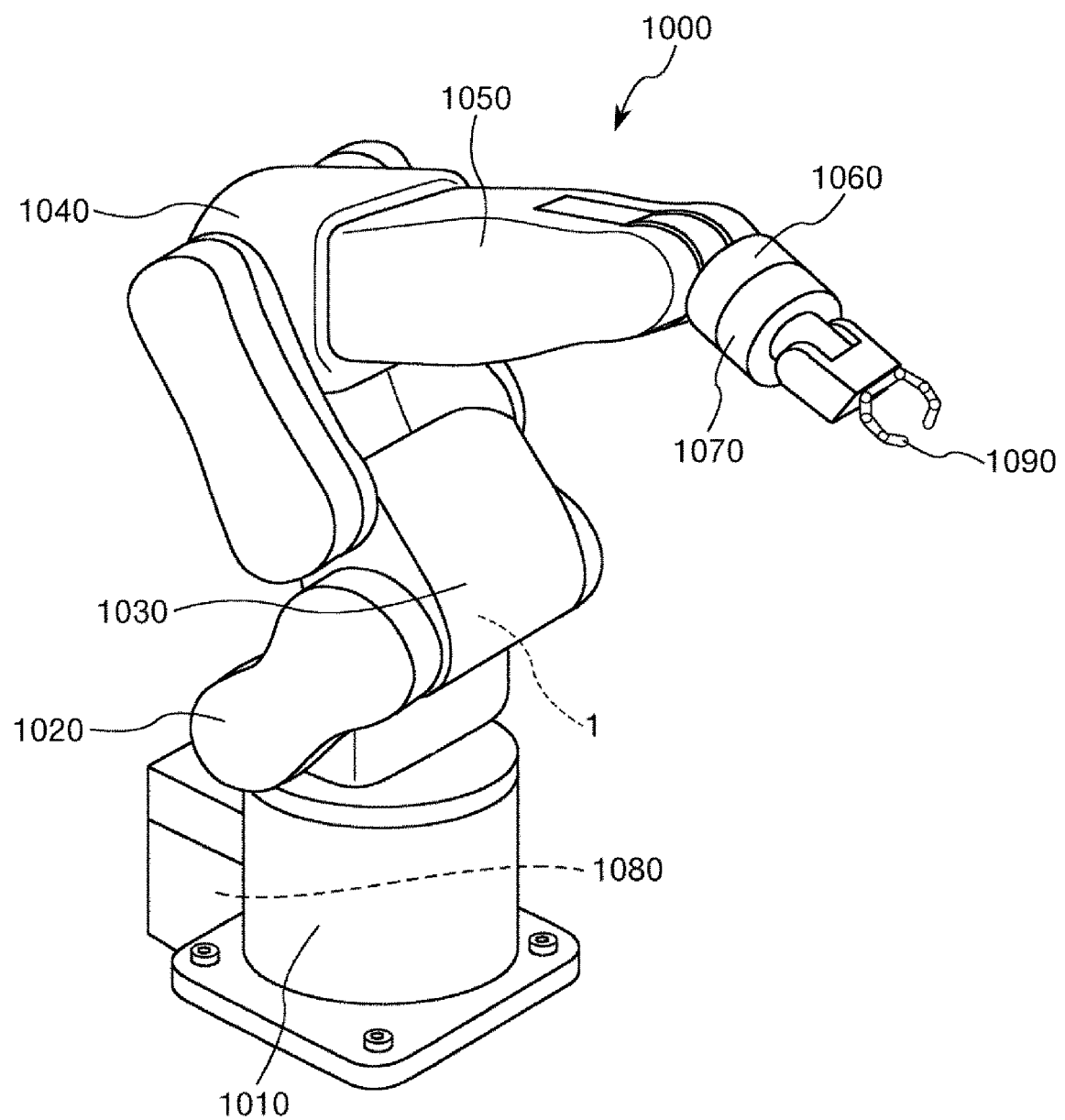
FIG. 19 is a schematic perspective view showing a robot according to a seventh embodiment.

FIG. 19 is the schematic perspective view showing the robot according to the seventh embodiment.

A robot 1000 according to the embodiment may perform work of feeding, removing, carrying, assembly, etc. of precision apparatuses and components forming the apparatuses. As shown in FIG. 19, the robot 1000 is a six-axis robot, and has a base 1010 fixed to a floor or ceiling, an arm 1020 pivotably coupled to the base 1010, an arm 1030 pivotably coupled to the arm 1020, an arm 1040 pivotably coupled to the arm 1030, an arm 1050 pivotably coupled to the arm 1040, an arm 1060 pivotably coupled to the arm 1050, an arm 1070 pivotably coupled to the arm 1060, and a control apparatus 1080 that controls driving of these arms 1020, 1030, 1040, 1050, 1060, 1070.

In the arm 1070, a hand coupling part is provided, and an end effector 1090 according to work to be executed by the robot 1000 is attached to the hand coupling part. The piezoelectric motors 1 are provided in all or part of respective joint parts and the respective arms 1020, 1030, 1040, 1050, 1060, 1070 pivot by driving of the piezoelectric motors 1. Note that the piezoelectric motor 1 may be provided in the end effector 1090 and used for driving of the end effector 1090.

The control apparatus 1080 includes a computer having e.g. a processor (CPU), memory, I/F (interface), etc. The processor executes predetermined programs (code strings) stored in the memory, and thereby, controls driving of the respective parts of the robot 1000. Note that the programs may be downloaded from an external server via the I/F. All or part of the configurations of the control apparatus 1080 may be provided outside of the robot 1000 and connected via a communication network such as a LAN (local area network).

As described above, the robot 1000 has the piezoelectric motors 1. That is, the robot 1000 has the vibrator 41 including the driving piezoelectric elements 6A to 6E and vibrating by application of the drive signals V1 to V3 to the piezoelectric elements 6A to 6E, the rotor 2 as the driven unit that moves by the vibration of the vibrator 41, and the drive signal generation units 70 that output and apply the drive signals V1 to V3 to the piezoelectric elements 6A to 6E.

The method of controlling the robot 1000 may realize stable vibration and low-speed control of the vibrator 41 including the piezoelectric elements 6A to 6E by the drive signal generation units 70 intermittently outputting the drive signals V1 to V3 to the piezoelectric elements 6A to 6E. Further, the time T2 when the output of the drive signals V1 to V3 is stopped is set to be shorter than the time T3 from when output of the drive signal is stopped to stoppage of the vibration of the vibrator 41, and thereby, the vibrator 41 may be vibrated before the stoppage of the vibration of the vibrator 41, the vibrator 41 may be stably vibrated, and the low-speed control may be maintained. Accordingly, the robot 1000 having stable low-speed drive performance may be obtained.

Eighth Embodiment

Next, a method of controlling a printer according to the eighth embodiment will be explained with reference to FIG. 20.

Figure 20:
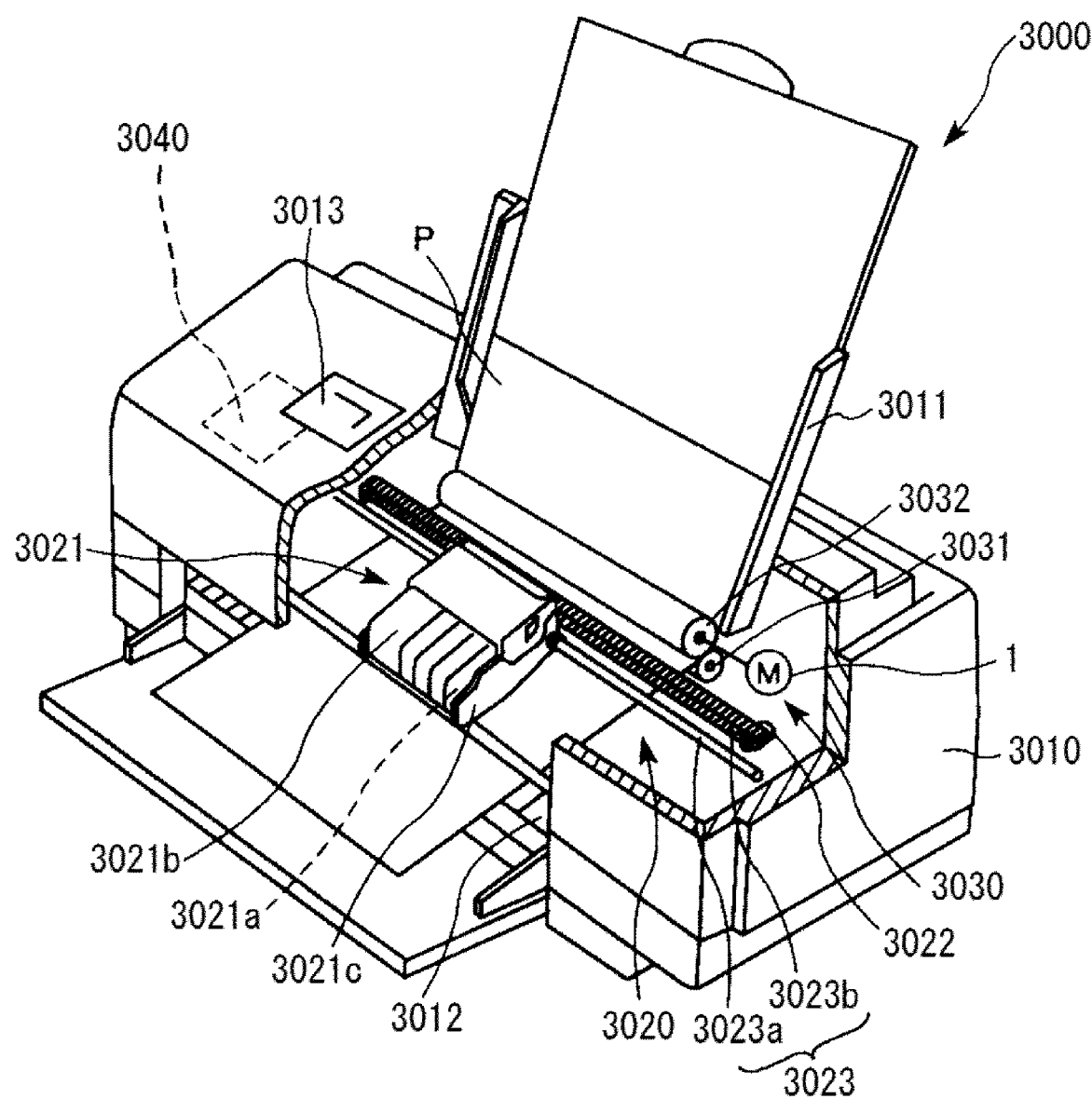
FIG. 20 is a schematic perspective view showing an overall configuration of a printer according to an eighth embodiment.

FIG. 20 is the schematic diagram showing the overall configuration of the printer according to the eighth embodiment of the present disclosure.

As shown in FIG. 20, a printer 3000 according to the embodiment includes an apparatus main body 3010, a printing mechanism 3020 provided inside of the apparatus main body 3010, a paper feed mechanism 3030, and a control apparatus 3040. In the apparatus main body 3010, a tray 3011 in which recording paper P is placed, a paper eject opening 3012 through which the recording paper P is ejected, and an operation panel 3013 of a liquid crystal display or the like are provided.

The printing mechanism 3020 includes a head unit 3021, a carriage motor 3022, and a reciprocation mechanism 3023 that reciprocates the head unit 3021 by drive power of the carriage motor 3022. The head unit 3021 has a head 3021*a* as an inkjet recording head, an ink cartridge 3021*b* that supplies ink to the head 3021*a*, and a carriage 3021*c* on which the head 3021*a* and the ink cartridge 3021*b* are mounted.

The reciprocation mechanism 3023 has a carriage guide shaft 3023*a* that reciprocably supports the carriage 3021*c* and a timing belt 3023*b* that moves the carriage 3021*c* on the carriage guide shaft 3023*a* by the drive power of the carriage motor 3022. The paper feed mechanism 3030 has a driven roller 3031 and a driving roller 3032 in press contact with each other, and the piezoelectric motor 1 that drives the driving roller 3032.

In the printer 3000, the paper feed mechanism 3030 intermittently feeds the recording paper P one by one to the vicinity of the lower part of the head unit 3021. Concurrently, the head unit 3021 reciprocates in directions nearly orthogonal to the feed direction of the recording paper P, and printing on the recording paper P is performed.

The control apparatus 3040 includes a computer having e.g. a processor (CPU), memory, I/F (interface), etc. The processor executes predetermined programs (code strings) stored in the memory, and thereby, controls driving of the respective parts of the printer 3000. For example, the control is executed based on print data input from a host computer such as a personal computer via the I/F. Note that the programs may be downloaded from an external server via the I/F. All or part of the configurations of the control apparatus 3040 may be provided outside of the printer 3000 and connected via a communication network such as a LAN (local area network).

As described above, the printer 3000 has the piezoelectric motor 1. That is, the printer 3000 has the vibrator 41 including the driving piezoelectric elements 6A to 6E and vibrating by application of the drive signals V1 to V3 to the piezoelectric elements 6A to 6E, the rotor 2 as the driven unit that moves by the vibration of the vibrator 41, and the drive signal generation units 70 that apply the drive signals V1 to V3 to the piezoelectric elements 6A to 6E.

The method of controlling the printer 3000 may realize stable vibration and low-speed control of the vibrator 41 including the piezoelectric elements 6A to 6E by the drive signal generation units 70 intermittently outputting the drive signals V1 to V3 to the piezoelectric elements 6A to 6E. Further, the time T2 when the output of the drive signals V1 to V3 is stopped is set to be shorter than the time T3 from when output of the drive signal is stopped to stoppage of the vibration of the vibrator 41, and thereby, the vibrator 41 may be vibrated before the stoppage of the vibration of the vibrator 41, the vibrator 41 may be stably vibrated, and the low-speed control may be maintained. Accordingly, the printer 3000 having stable low-speed drive performance may be obtained.

Note that, in the embodiment, the piezoelectric motor 1 drives the driving roller 3032 for paper feed, however, may also drive e.g. the carriage 3021*c*.

As above, the method of controlling the piezoelectric motor 1 as the piezoelectric drive device, the method of controlling the robot 1000, and the method of controlling the printer 3000 according to the present disclosure are explained according to the illustrated embodiments, however, the present disclosure is not limited to those. The configurations of the respective parts may be replaced by arbitrary configurations having the same functions. Further, other arbitrary configurations may be added to the present disclosure. Furthermore, the respective embodiments may be combined as appropriate.

As below, the matter derived from the above described embodiments will be described.

A method of controlling a piezoelectric drive device is a method of controlling a piezoelectric drive device having a vibrator including a piezoelectric element, a driven unit that moves at a target speed by vibration of the vibrator, and a drive signal generation unit that generates a drive signal and outputs the drive signal to the piezoelectric element, and of including intermittently outputting the drive signal to the piezoelectric element by the drive signal generation unit, wherein a time when output of the drive signal is stopped is shorter than a time from when output of the drive signal is stopped to stoppage of the vibration.

According to the method of controlling the piezoelectric drive device, the drive signal generation unit intermittently outputs the drive signal to the piezoelectric element, and thereby, may stably vibrate and low-speed control the vibrator. Further, the time when the output of the drive signal is stopped is set to be shorter than the time from when output of the drive signal is stopped to stoppage of the vibration of the vibrator, and thereby, the vibrator may be vibrated before the stoppage of the vibration of the vibrator, the vibrator may be stably vibrated, and the low-speed control may be maintained.

In the above described method of controlling the piezoelectric drive device, the time when the output is stopped may be constant regardless of the target speed.

According to the method of controlling the piezoelectric drive device, the time when the output of the drive signal is stopped is set to be constant regardless of the target speed, and thereby, the low-speed control may be easier.

In the above described method of controlling the piezoelectric drive device, a time when the drive signal is output may be set to be shorter when the target speed is decreased.

According to the method of controlling the piezoelectric drive device, the time when the drive signal is output is set to be shorter when the target speed is decreased, thereby, a time when the vibrator is vibrated becomes shorter and the vibration speed becomes lower, and thus, the driven unit may be driven at a lower speed.

In the above described method of controlling the piezoelectric drive device, the drive signal generation unit may control flexural vibration or stretching vibration of the vibrator.

According to the method of controlling the piezoelectric drive device, the drive signal generation unit intermittently outputs the drive signal to the piezoelectric element and controls flexural vibration or stretching vibration of the vibrator, and thereby, may allow the vibrator to make elliptic motion and drive the driven unit.

In the above described method of controlling the piezoelectric drive device, the drive signal output by the drive signal generation unit may have a PWM waveform.

According to the method of controlling the piezoelectric drive device, the drive signal output by the drive signal generation unit has the PWM waveform, thereby, the amplitude of the drive voltage may be controlled as the amplitude of the pulse wave to form the drive signal, and thus, the drive signal may be intermittently output and the vibrator may be stably vibrated and low-speed controlled.

In the above described method of controlling the piezoelectric drive device, the drive signal output by the drive signal generation unit may be DA-converted, and then, amplified.

According to the method of controlling the piezoelectric drive device, the drive signal output by the drive signal generation unit is DA-converted, then, amplified, and thereby, the drive signal may be intermittently output and the vibrator may be stably vibrated and low-speed controlled.

A method of controlling a robot is a method of controlling a robot having a vibrator including a piezoelectric element, a driven unit that moves at a target speed by vibration of the vibrator, and a drive signal generation unit that generates a drive signal and outputs the drive signal to the piezoelectric element, and of including intermittently outputting the drive signal to the piezoelectric element by the drive signal generation unit, wherein a time when output of the drive signal is stopped is shorter than a time from when output of the drive signal is stopped to stoppage of the vibration.

According to the method of controlling the robot, the drive signal generation unit intermittently outputs the drive signal to the piezoelectric element, and thereby, may stably vibrate and low-speed control the vibrator. Further, the time when the output of the drive signal is stopped is set to be shorter than the time from when output of the drive signal is stopped to stoppage of the vibration of the vibrator, and thereby, the vibrator may be vibrated before the stoppage of the vibration of the vibrator, the vibrator may be stably vibrated, and the low-speed control may be maintained.

A method of controlling a printer is a method of controlling a printer having a vibrator including a piezoelectric element, a driven unit that moves at a target speed by vibration of the vibrator, and a drive signal generation unit that generates a drive signal and outputs the drive signal to the piezoelectric element, and of including intermittently outputting the drive signal to the piezoelectric element by the drive signal generation unit, wherein a time when output of the drive signal is stopped is shorter than a time from when output of the drive signal is stopped to stoppage of the vibration.

According to the method of controlling the printer, the drive signal generation unit intermittently outputs the drive signal to the piezoelectric element, and thereby, may stably vibrate and low-speed control the vibrator. Further, the time when the output of the drive signal is stopped is set to be shorter than the time from when output of the drive signal is stopped to stoppage of the vibration of the vibrator, and thereby, the vibrator may be vibrated before the stoppage of the vibration of the vibrator, the vibrator may be stably vibrated, and the low-speed control may be maintained.

What is claimed is:

1. A method of controlling a piezoelectric drive device having:
    a vibrator including a piezoelectric element;
    a driven unit that moves at a target speed by vibration of the vibrator; and
    a drive signal generation unit that generates a drive signal and outputs the drive signal to the piezoelectric element, comprising
    outputting, by the drive signal generation unit, a first driving signal to the piezoelectric element for a first term, stopping the outputting of the first driving signal for a second term, outputting a second driving signal to the piezoelectric element for a third term, sequentially, to vibrate the piezoelectric element according to outputting the first and the second driving signals, wherein, a vibration amount of the piezoelectric element is decreased during the second term and the second driving signal is outputted before vibration of the piezoelectric element is stopped.

2. The method of controlling the piezoelectric drive device according to claim 1, further comprising
    stopping the outputting of the second signal for a fourth term after the third term, wherein the second term and the forth term is the same.

3. The method of controlling the piezoelectric drive device according to claim 1, wherein
    the second term is set to be shorter than the first term when the target speed is changed to be decreased after the first term.

4. The method of controlling the piezoelectric drive device according to claim 2, wherein the second term is set to be shorter than the first term when the target speed is changed to be decreased after the first term.

5. The method of controlling the piezoelectric drive device according to claim 1, wherein
the drive signal generation unit controls flexural vibration or stretching vibration of the vibrator.

6. The method of controlling the piezoelectric drive device according to claim 2, wherein
the drive signal generation unit controls flexural vibration or stretching vibration of the vibrator.

7. The method of controlling the piezoelectric drive device according to claim 3, wherein
the drive signal generation unit controls flexural vibration or stretching vibration of the vibrator.

8. The method of controlling the piezoelectric drive device according to claim 1, wherein
the drive signal output by the drive signal generation unit has a PWM waveform.

9. The method of controlling the piezoelectric drive device according to claim 2, wherein
the drive signal output by the drive signal generation unit has a PWM waveform.

10. The method of controlling the piezoelectric drive device according to claim 3, wherein
the drive signal output by the drive signal generation unit has a PWM waveform.

11. The method of controlling the piezoelectric drive device according to claim 5, wherein
the drive signal output by the drive signal generation unit has a PWM waveform.

12. The method of controlling the piezoelectric drive device according to claim 1, wherein
the drive signal output by the drive signal generation unit is DA-converted, and then, amplified.

13. The method of controlling the piezoelectric drive device according to claim 2, wherein
the drive signal output by the drive signal generation unit is DA-converted, and then, amplified.

14. The method of controlling the piezoelectric drive device according to claim 3 wherein
the drive signal output by the drive signal generation unit is DA-converted, and then, amplified.

15. The method of controlling the piezoelectric drive device according to claim 5, wherein
the drive signal output by the drive signal generation unit is DA-converted, and then, amplified.

16. A method of controlling a robot having:
a vibrator including a piezoelectric element;
a driven unit that moves at a target speed by vibration of the vibrator; and
a drive signal generation unit that generates a drive signal and outputs the drive signal to the piezoelectric element, comprising
outputting, by the drive signal generation unit, a first driving signal to the piezoelectric element for a first term, stopping the outputting of the first driving signal for a second term, outputting a second driving signal to the piezoelectric element for a third term, sequentially, to vibrate the piezoelectric element according to outputting the first and the second driving signals, wherein, a vibration amount of the piezoelectric element is decreased during the second term and the second driving signal is outputted before vibration of the piezoelectric element is stopped.

17. A method of controlling a printer having:
a vibrator including a piezoelectric element;
a driven unit that moves at a target speed by vibration of the vibrator; and
a drive signal generation unit that generates a drive signal and outputs the drive signal to the piezoelectric element, comprising
outputting, by the drive signal generation unit, a first driving signal to the piezoelectric element for a first term, stopping the outputting of the first driving signal for a second term, outputting a second driving signal to the piezoelectric element for a third term, sequentially, to vibrate the piezoelectric element according to outputting the first and the second driving signals, wherein, a vibration amount of the piezoelectric element is decreased during the second term and the second driving signal is outputted before vibration of the piezoelectric element is stopped.

* * * * *